United States Patent
Ramaswamy et al.

(10) Patent No.: US 7,751,341 B2
(45) Date of Patent: Jul. 6, 2010

(54) MESSAGE DISTRIBUTION ACROSS FIBRE CHANNEL FABRICS

(75) Inventors: Badrinarayanan Ramaswamy, Saratoga, CA (US); Joy Chatterjee, Kundalahalli (IN); Rituparna Agrawal, Chandra Reddy Layout (IN); Subrata Banerjee, Los Altos, CA (US); Sudheer Yelanduru Raghavendra, Jayanagar (IN); Thomas Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1332 days.

(21) Appl. No.: 10/959,911

(22) Filed: Oct. 5, 2004

(65) Prior Publication Data
US 2006/0072587 A1    Apr. 6, 2006

(51) Int. Cl.
*H04L 12/28* (2006.01)
*H04L 12/56* (2006.01)
(52) U.S. Cl. .................. 370/254; 370/396; 370/401
(58) Field of Classification Search .............. None
See application file for complete search history.

(56) References Cited

U.S. PATENT DOCUMENTS

| 6,765,919 | B1 * | 7/2004 | Banks et al. ............. 370/401 |
| 6,973,023 | B1 * | 12/2005 | Saleh et al. ............. 370/217 |
| 7,171,476 | B2 * | 1/2007 | Maeda et al. ............ 709/227 |
| 7,397,768 | B1 * | 7/2008 | Betker .................... 370/254 |

OTHER PUBLICATIONS http://www.snia.org, SNIA IP Storage Forum, Transitioning to IP Storage Networks, Using Internet Fibre Channel Protocol (iFCP), pdf posted Mar. 19, 2002, 62 pages.

* cited by examiner

*Primary Examiner*—Pankaj Kumar
*Assistant Examiner*—Marcus R Smith
(74) *Attorney, Agent, or Firm*—Weaver Austin Villeneuve & Sampson LLP (57) ABSTRACT

According to the present invention, methods and apparatus are provided to allow for distribution of fiber channel messages. Messages associated with a variety of applications can be distributed within a single logical fabric to physical connected but logically disconnected fabrics. Interconnecting switches forward messages to neighboring fabrics and aggregate responses before replying to a first fabric.

26 Claims, 10 Drawing Sheets

MESSAGE DISTRIBUTION ACROSS FIBRE CHANNEL FABRICS

BACKGROUND OF THE INVENTION

1. Field of the Invention

The present invention generally relates to fibre channel message distribution. More specifically, the present invention provides techniques and mechanisms for message distribution across fibre channel fabrics.

2. Description of Related Art

Fibre channel switches can be arranged in a variety of manners. Some switches can be configured in a single logical fabric. Others can be arranged as a single physical fabric including multiple logical fabrics. The various arrangements allow flexibility in configuring available resources. However, switches in one logical fibre channel fabric can not communicate with switches in other logical fibre channel fabrics. Conventional protocols for distributing information from one switch to another switch only allow distribution to switches in a single logical fabric or a single physical fabric.

Consequently, it is desirable to provide techniques for distribution of messages across fibre channel fabrics.

SUMMARY OF THE INVENTION

According to the present invention, methods and apparatus are provided to allow for distribution of fibre channel messages. Messages associated with a variety of applications can be distributed within a single logical fabric to physical connected but logically disconnected fabrics. Interconnecting switches forward messages to neighboring fabrics and aggregate responses before replying to a first fabric.

In one embodiment, a method for transmitting messages across logical fibre channel fabrics is provided. It is determined that a plurality of first logical fibre channel fabric switches support a service. Messages associated with the service are distributed to the plurality of first logical fibre channel fabric switches including a first interconnecting switch that is included in both a first logical fibre channel fabric and a second logical fibre channel fabric. Reply messages corresponding to the distributed messages are received from the plurality of first logical fibre channel fabric switches. Receiving a reply message from the first interconnecting switch indicates that messages were successfully distributed to a plurality of second logical fibre channel fabric switches.

In another embodiment, a fibre channel switch is provided. The fibre channel switch includes memory, a processor, an output interface, and an input interface. The processor is coupled to memory. The processor operable to determine that a plurality of first logical fibre channel fabric switches support a service. An output interface is coupled to the processor. The output interface is operable to distribute messages associated with the service to the plurality of first logical fibre channel fabric switches including a first interconnecting switch that is included in both a first logical fibre channel fabric and a second logical fibre channel fabric. The input interface is coupled to the processor. The input interface is operable to receive reply messages corresponding to the distributed messages from the plurality of first logical fibre channel fabric switches. Receiving a reply message from the first interconnecting switch indicates that messages were successfully distributed to a plurality of second logical fibre channel fabric switches.

In another embodiment, a method for distributing information from a logical fibre channel switch is provided. It is determined that a plurality of first logical fibre channel fabric switches support a service. Messages associated with the service are distributed to the plurality of first logical fibre channel fabric switches including a first interconnecting switch that is included in both a first logical fibre channel fabric and a second logical fibre channel fabric. Reply messages corresponding to the distributed messages are received from the plurality of first logical fibre channel fabric switches. Receiving a reply message from the first interconnecting switch indicates that messages were successfully distributed to a plurality of second logical fibre channel fabric switches.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to fibre channel network variations. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

A fibre channel fabric can be configured in a variety of manners. In some examples, a number of fibre channel switches can be interconnected to form a physical fibre channel fabric. Devices such as hosts and servers as well as disk arrays can be interconnected through the physical fibre channel fabric. When a particular entity wishes to distribute information to other entities in the fibre channel fabric, information can be forwarded to all other switches in the fibre channel fabric. Each fibre channel switch is typically at least aware of how to send a message to the other fibre channel switches and other nodes within the logical fabric.

In some instances, multiple logical fibre channel fabrics are interconnected through devices such as storage routers. A storage router allows limited communication between switches in different fibre channel fabrics. However, devices within each logical fibre channel fabric are often not aware of devices in other logical fibre channel fabrics connected through the storage router.

Fibre channel switches can also be arranged as a logical or virtual fibre channel fabric. Physically connected devices can be arranged as separate logical fabrics to allow customized arrangement of fabric resources. In many of these logical fibre channel fabrics, switches in one logical fibre channel fabric can not communicate with switches in other logical fibre channel fabrics.

Distributing information to a variety of fibre channel switches is typically very difficult. For example, consistent configuration information can not be shared across an entire fabric, unless it is configured in each switch. Discovering application capability in the physical network is also typically not possible. Furthermore, there are no methods to distribute information to a logically disconnected but physically connected network.

Consequently, the techniques and mechanisms for the present invention provide a fabric wide service to detect various applications active in switches at the physical switch level. The mechanism allows distribution of information such as configuration information to applications while providing a mechanism to filter distribution based on application capabilities and participating switches in the fabric. Distribution is provided in the reliable manner with support for both coordinated and uncoordinated distribution. That is, locking can be used based on user selections to insure coordinated data distribution.

Furthermore, to distribute information to various switches within a fabric, a switch typically knows about how to send messages to all the switches within the same fabric. The switch can send messages to all switches within the fabric, logical or physical. However, when many switches reside outside the fabric, it may not always be possible to communicate with or determine the identity of switches outside a particular fabric. For example, a source switch may be connected to a target switch through a number of different fabrics. Consequently, it is typically difficult for a particular switch to learn the identities of the other switches and send messages to the other switches.

The techniques and mechanisms of the present invention provide that switches only send messages to the switches that are members of fabrics in which they reside. For example, if a switch is a member of fabric A and fabric B, it may be responsible for forwarding a message from fabric A to all of the members of fabric B and aggregating all responses before sending a response to fabric A. That way, no new configuration information is needed for each switch.

If a switch in fabric B is also a member of fabric C, it is then responsible for forwarding the message from fabric B to all the switches within fabric C and aggregating all of the responses before sending a response to fabric B. Each switch is already aware of member switches within its own logical or physical fabric. Information can be maintained within messages to prevent messages from being distributed redundantly.

Figure 1:
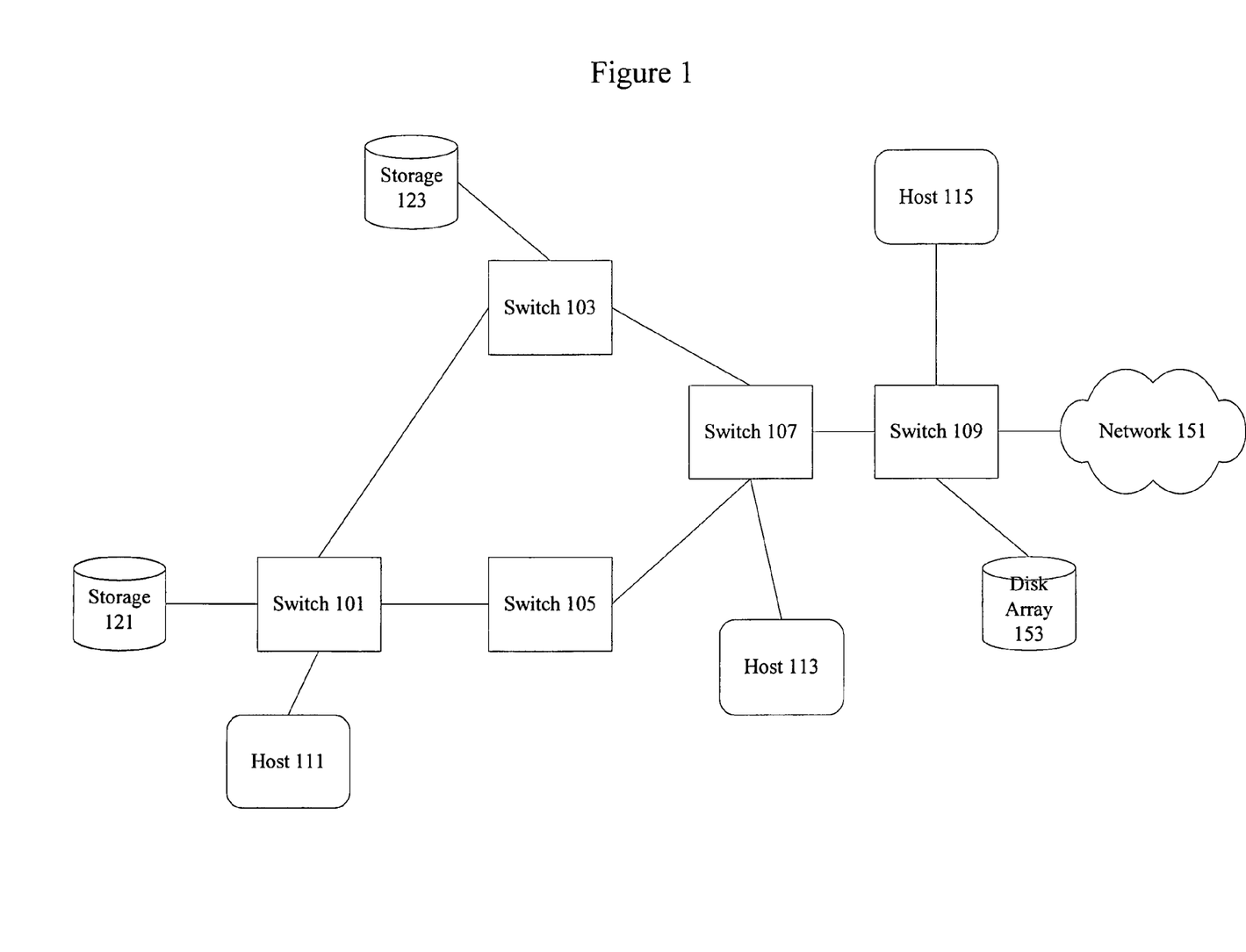
FIG. 1 is a diagrammatic representation showing a physical fibre channel fabric.

FIG. 1 shows one example of a storage area network having switches that can implement the techniques and mechanisms of the present invention. A switch 101 is coupled to switches 103 and 105 as well as to a host 111 and storage 121. Switch 101 may be connected to other entities through multiple physical links or channels configured as logical links or port channels. In one embodiment, host 111 may be a server or client system while storage 121 may be single disk or a redundant array of independent disks (RAID). Switches 103 and 105 are both coupled to switch 107. Switch 107 is connected to host 113 and switch 103 is connected to storage 123. Switch 109 is connected to host 115, switch 107, disk array 153, and an external network 151 that may or may not use fibre channel. Messages can be distributed to reach all switches across the fabric.

Fibre channel networks typically allow transmission using a credit mechanism that is distinct from the typical IP network transmission mechanism. Instead of dropping packets, fibre channel networks only allow transmission when sufficient credits are available. For example, a buffer-to-buffer credit mechanism is used to control traffic flow from switch 107 to switch 109. In typical implementations, a network node such as a switch 109 allocates a predetermined number of credits to switch 107. Every time the switch 107 transmits frames to switch 109, credits are used. A switch 109 can then allocate additional credits to switch 107 when the switch 109 has available buffers. When a switch 107 runs out of credits, it can no longer transmit to switch 109.

Figure 2:
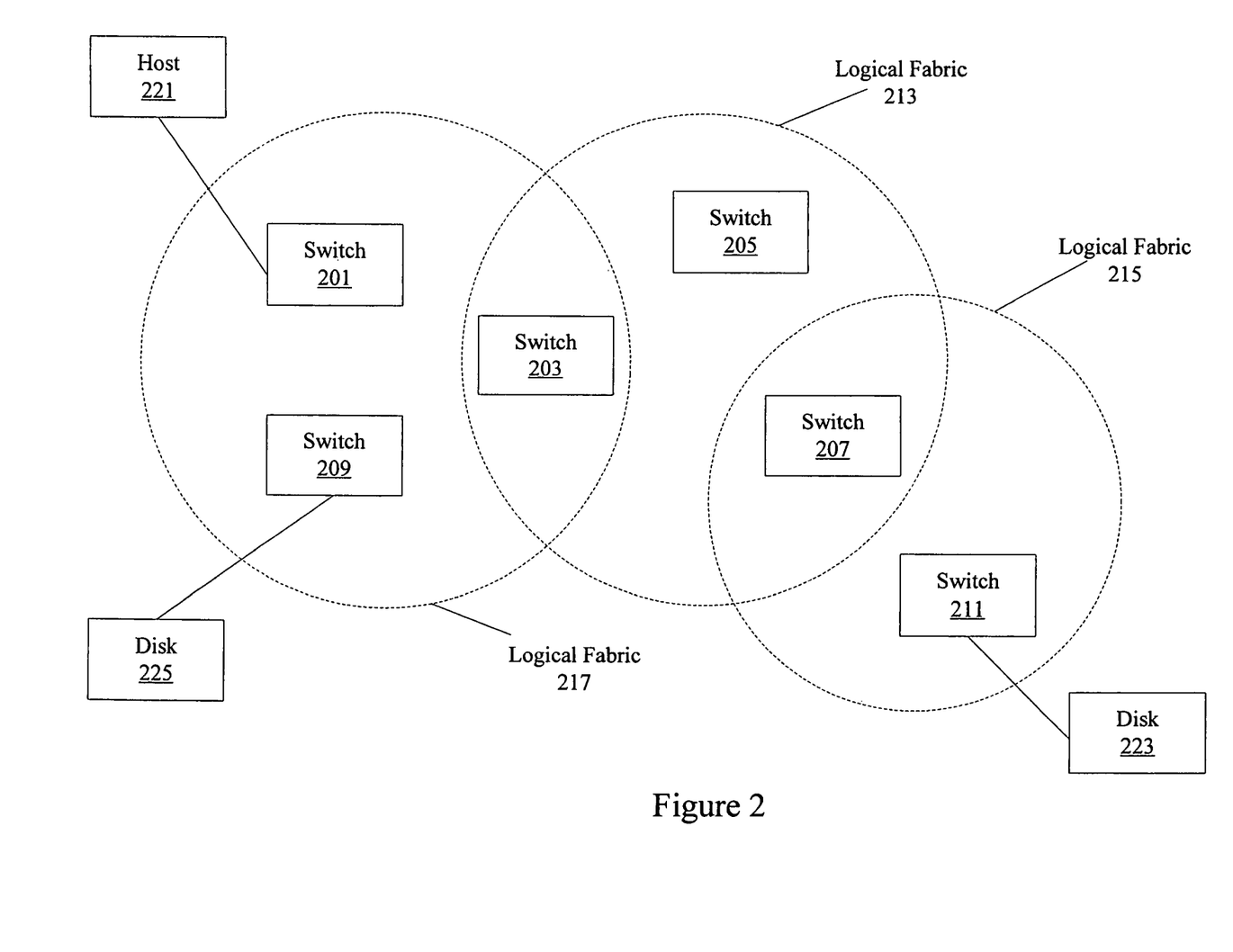
FIG. 2 is a diagrammatic representation showing multiple logical fibre channel fabrics.

FIG. 2 is a diagrammatic representation showing a physical fibre channel fabric configured as separate logical fibre channel fabrics. The physical fibre channel fabric includes interconnected switches 201, 203, 205, 207, and 209. Host 221 is connected to switch 201. Disk 225 is connected to switch 209. Disk 223 is connected to switch 211. Switches 201, 203, and 209 are arranged as logical fibre channel fabric 217. Switches 203, 205, and 207 are arranged as logical fibre channel fabric 213. Switches 207 and switch 211 are arranged as logical fibre channel fabric 215.

According to various embodiments each logical fibre channel fabric can operate as a separate logical entity. Within each logical entity, switches are aware and able to communicate with each other. Each entity coupled to a switch within a logical fabric can communicate with other entities associated with the same logical fabric. For example, host 221 can communicate with a disk 225. In one example, a disk 225 is given an alias. That is, the disk 225 is given a textual name in addition to a conventional numeric name. The textual name is distributed from switch 209 to other switches within the logical fabric 217. However, no conventional mechanisms allow distribution of messages such as textual name message to other logical fabrics even if the logical fabrics are connected. Furthermore, no conventional mechanisms allow distribution of messages associated with a new service to switches even within the same logical fabric.

For example, switch 209 can not distribute alias information to switch 211 and fabric 215. Similarly, switch 209 can not easily convey the alias information to switch 205 within the logical fabric 213. Mechanisms for conveying information across logical fabrics are limited. Furthermore, although FIG. 2 shows a physically connected fabric including multiple logical or logical fabrics, the techniques and mechanisms of the present invention also apply to different physical fabrics connected through mechanisms such a storage routers. The techniques and mechanisms of the present invention allow communication across fabrics both logical and physical.

Figure 3:
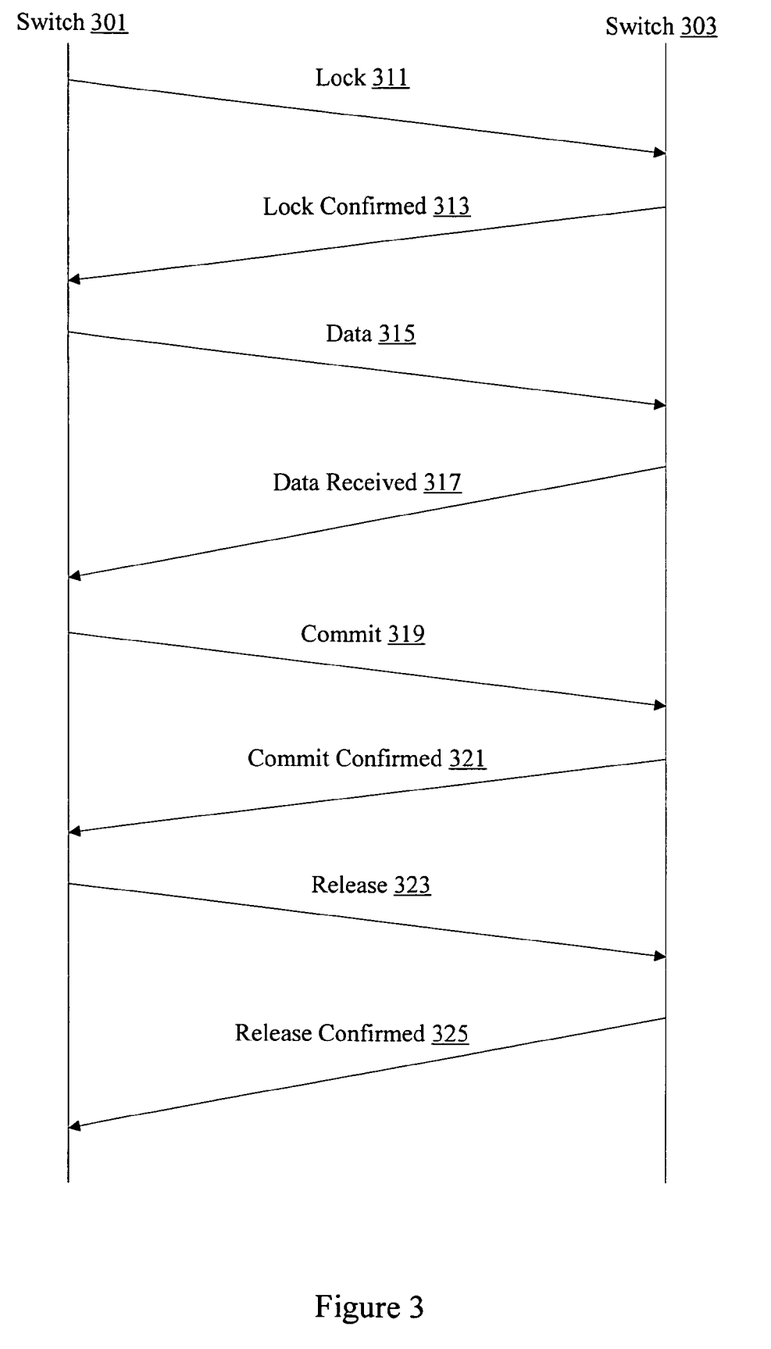
FIG. 3 is an exchange diagram showing a typical technique for exchanging information with locking.

When information is being distributed within the fabric, delay is not typically as important a factor as it is when information is being distributed across different fabrics. For example, FIG. 3 is an exchange diagram showing a mechanism for coordinated distribution of data within the fabric. Coordinated distribution allows switches within the fabric to provide information in a consistent state across different entities. For example, if the name is being distributed across different switches, coherency provides that another entity can not attempt to change the name until all of the switches within the network have been updated. One way to provide coherency is to use a locking mechanism. FIG. 3 shows use of a locking mechanism. A switch 301 sends a lock 311 to switch 303. If the switch 303 is not already locked, switch 303 can send a lock confirmed message 313 back to switch 301. When confirmed, the switch 301 can send data 315 to switch 303. Switch 303 can then send a data received message 317 back to switch 301.

It should be noted that the switch 301 may be directly connected to switch 303 within the fabric. However, switch 301 may also be connected to switch 303 through one or more other switches within the fabric. Switch 301 can then send a commit signal 319 to switch 303. Switch 303 can then send a commit confirmed message 321 back to switch 301. Switch 301 can then send a release message 323 to switch 303 and the switch 303 releases the lock and sends a release confirmed message 325 back to the switch 301. Because each switch is a maintained within a fabric, delay is typically not a significant factor. Consequently, the number of exchanges and exchange confirmations that may be relatively inefficient can be used.

Figure 4:
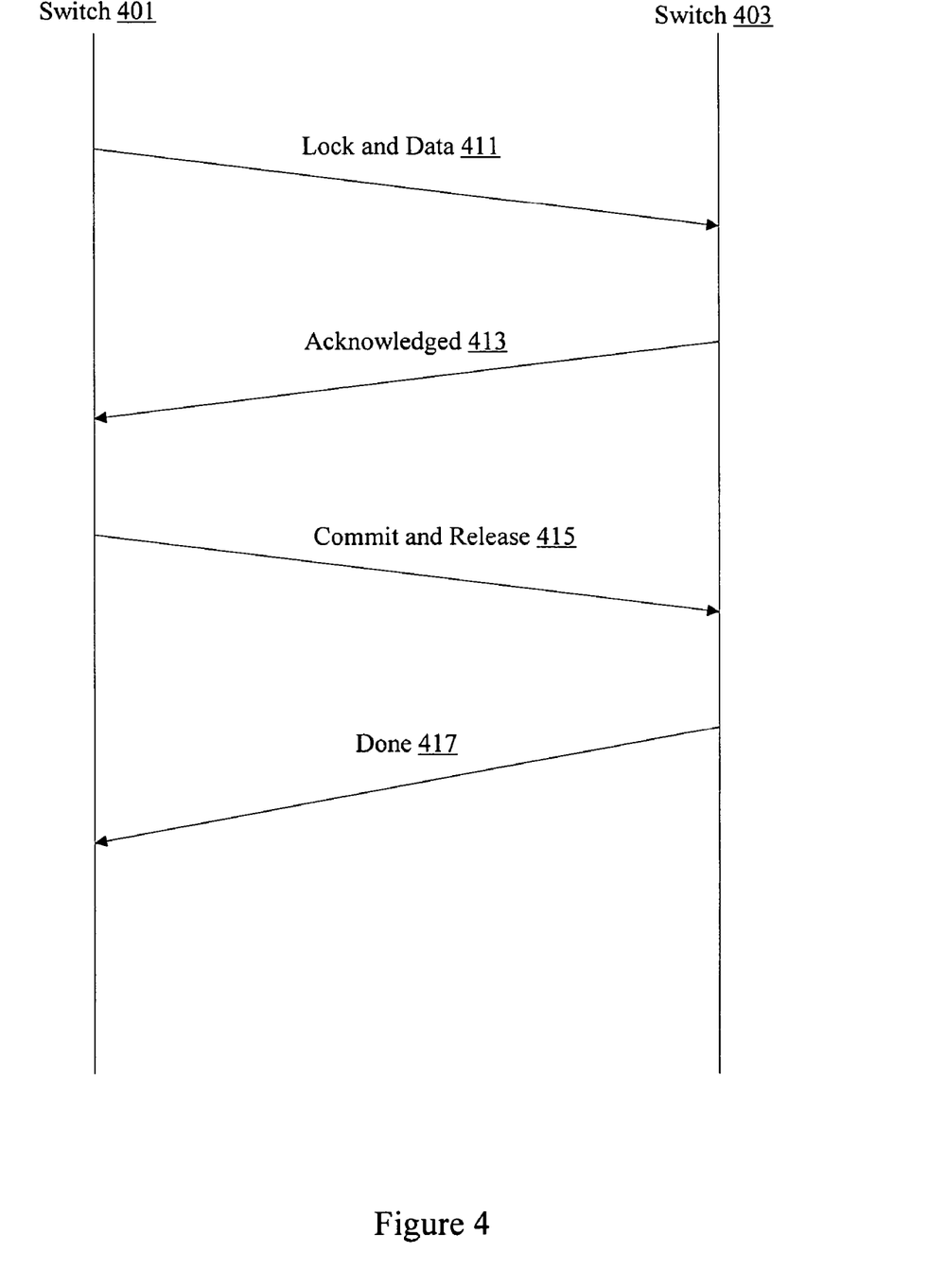
FIG. 4 is an exchange diagram showing a technique for exchanging information with locking according to various embodiments.

FIG. 4 is a diagrammatic representation of one example of a streamlined exchange that can be used to communicate across fabrics. A switch 401 sends both data and a lock request message 411 to switch 403. If no lock is available, the data is simply dropped and an acknowledgment indicating the drop is sent. If a lock is available, the lock and data are acknowledged with an acknowledgment message 413. Commit and release messages are combined into a single message 415 and sent to switch 403. In some examples, the switch may be reachable only through intervening logical fabrics. Consequently, it is recognized that it is beneficial to combine messages. A single done message 417 is sent in response to the combined commit and release message 415.

Figure 5:
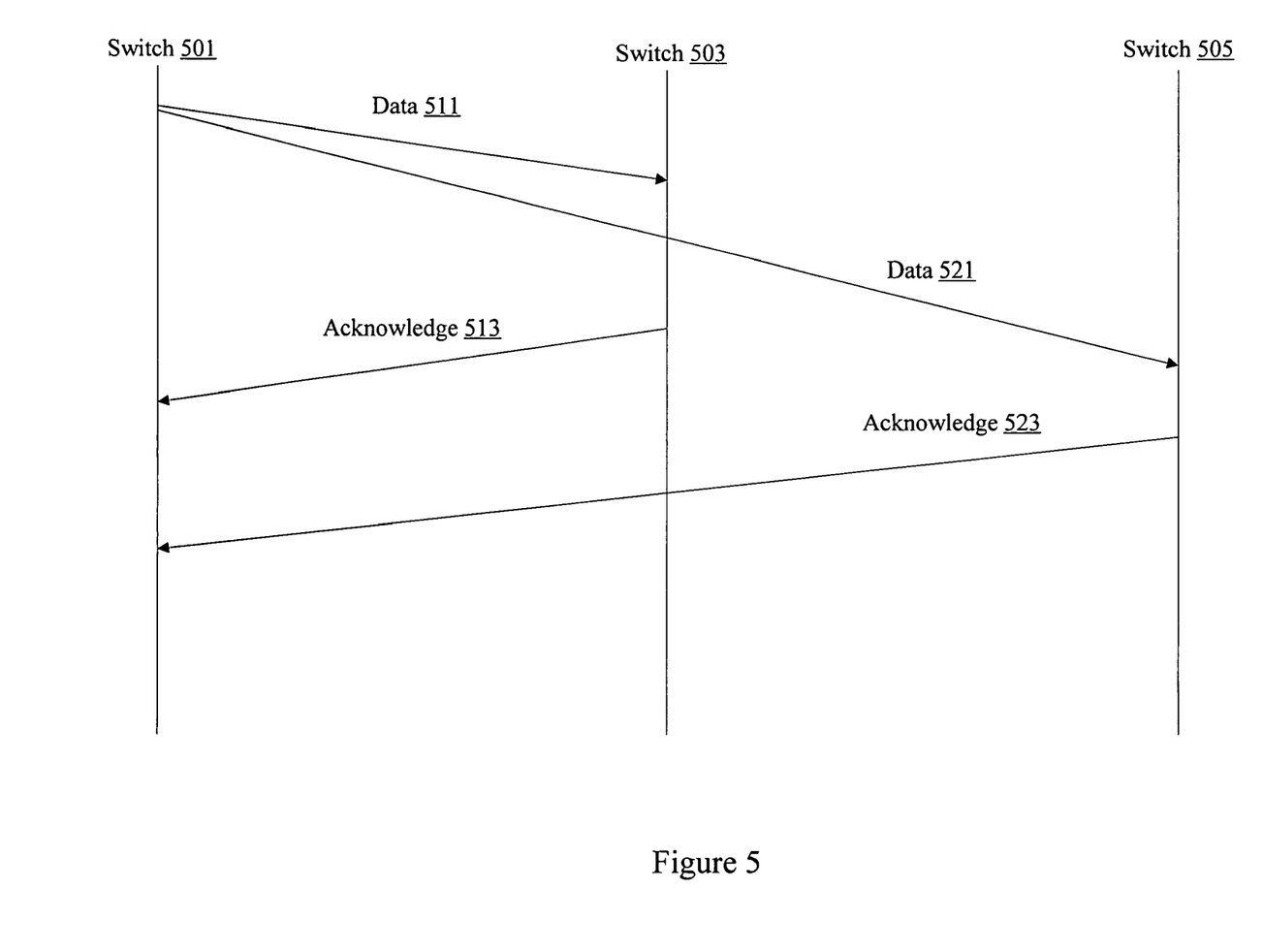
FIG. 5 is an exchange diagram showing a technique for exchanging information without locking.

FIG. 5 is an exchange diagram showing message distribution to multiple switches. The switch 501 sends messages to both switch 503 and switch 505. According to various embodiments, the switch 501 sends data 511 and data 521 to switches 503 and 505 respectively. Acknowledgment messages 513 and 523 are received from switches 503 and 505 respectively.

Figure 6:
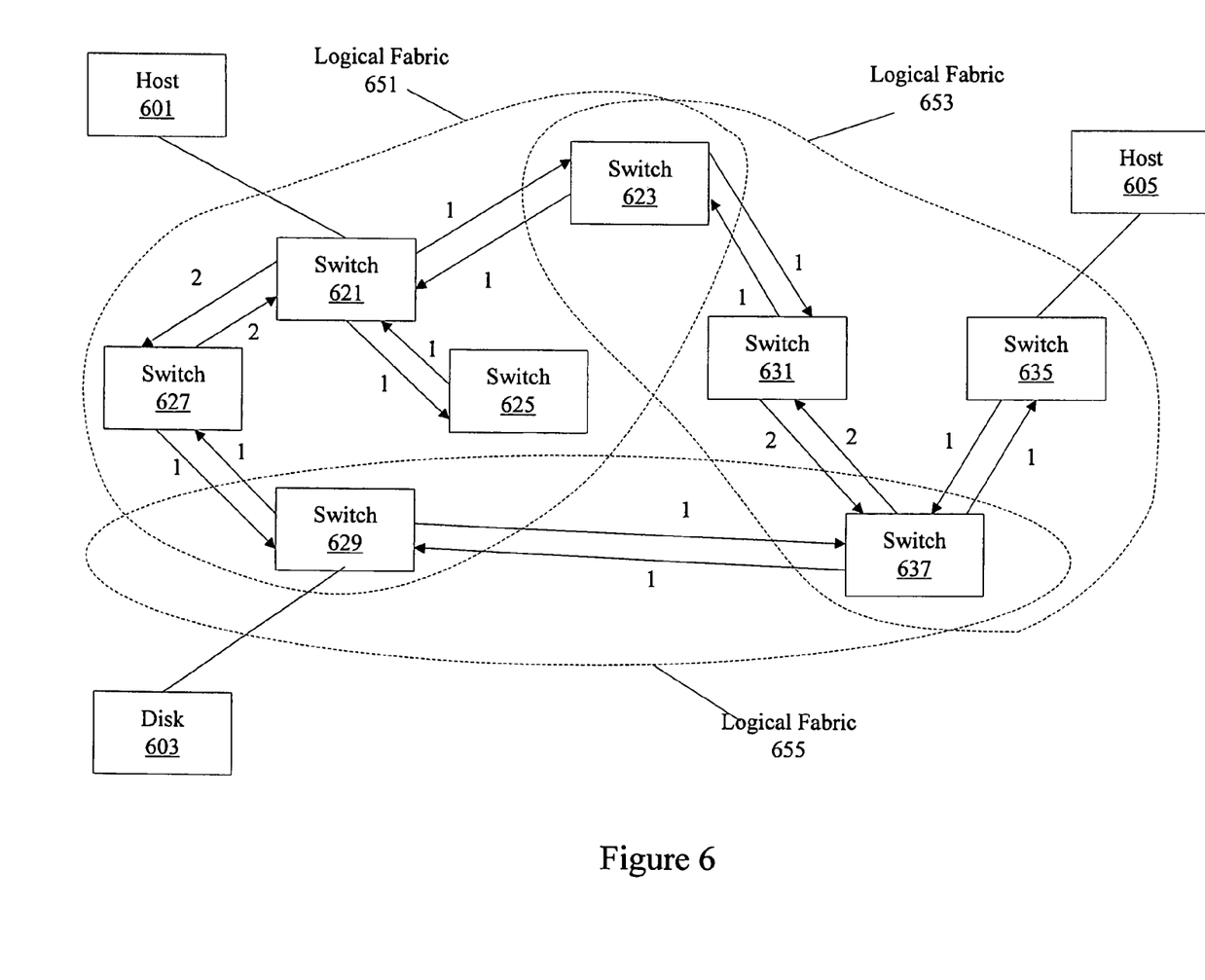
FIG. 6 is a diagrammatic representation showing physical connected fibre channel switches.

FIG. 6 is a diagrammatic representation showing a physically connected fabric including multiple logical fabrics. A fabric 651 includes switches 621, 623, 625, 627, and 629. The fabric 655 includes switches 629 and 637. The fabric 653 includes switches 623, 631, 635, and 637. A switch 629 acts as an interconnection switch between fabric 651 and 655. Switch 623 acts as an interconnection switch between fabric 651 and 653. Switch 637 acts as an interconnection switch between fabric 655 and fabric 653.

According to various embodiments, a switch 621 wishes to distribute a message to other switches supporting a particular service. In some examples, the message may indicate the availability of a new syslog server, an alias for a particular device, the location of an authenticating server, or other application service. Switch 621 is typically only aware of other switches within fabric 651. However, the techniques of the present invention allow for communication across fabrics. In one example, all other switches within the fabric support the particular application. Some other switches may be directly coupled to 621 while other switches at coupled to switch 621 through other switches. A switch 621 can then prepare messages for distribution to the four other switches within the fabric. Switch 621 sends a message to switch 623, a message to switch 625, a message to switch 627, and a message to switch 629.

In some embodiments, switch 621 sends a message sequence to switch 625 and receives the reply sequence from switch 625. Switch 621 sends two sets of messages to switch 627 and expects two sets of messages back. One set of replies is expected from switch 627 in the other set of replies is expected from switch 629. However, before the switch 629 sends a reply sequence back to switch 627 and eventually to switch 621, the switch 629 recognizes that it is also a member of fabric 655. Consequently, switch 629 adds fabric identifier information and switch identifier information to the message and forwards the message to switch 637. Switch 637 also does not send a reply set back to switch 629 until it has distributed the message to all known nodes in fabric 653.

Switch 637 attempts to send messages to switches 631, and 635, and 623. However, switch 623 may already received the message from 621 since switch 623 is an interconnecting switch. If so, the message can simply be dropped and an acknowledgment that the message was dropped can be sent. A variety of techniques such as sequence numbers, embedded information with an individual frames, or fabric identifier information can be used to track message redundancy. Information can be maintained at switches or carried in messages. If the switch 623 has not yet received the message from switch 621, it can update its state tables and send a reply back to switch 637 through switch 631. Consequently, the distribution switches are only responsible for sending the message to nodes in fabric in which it is a member.

Figure 7:
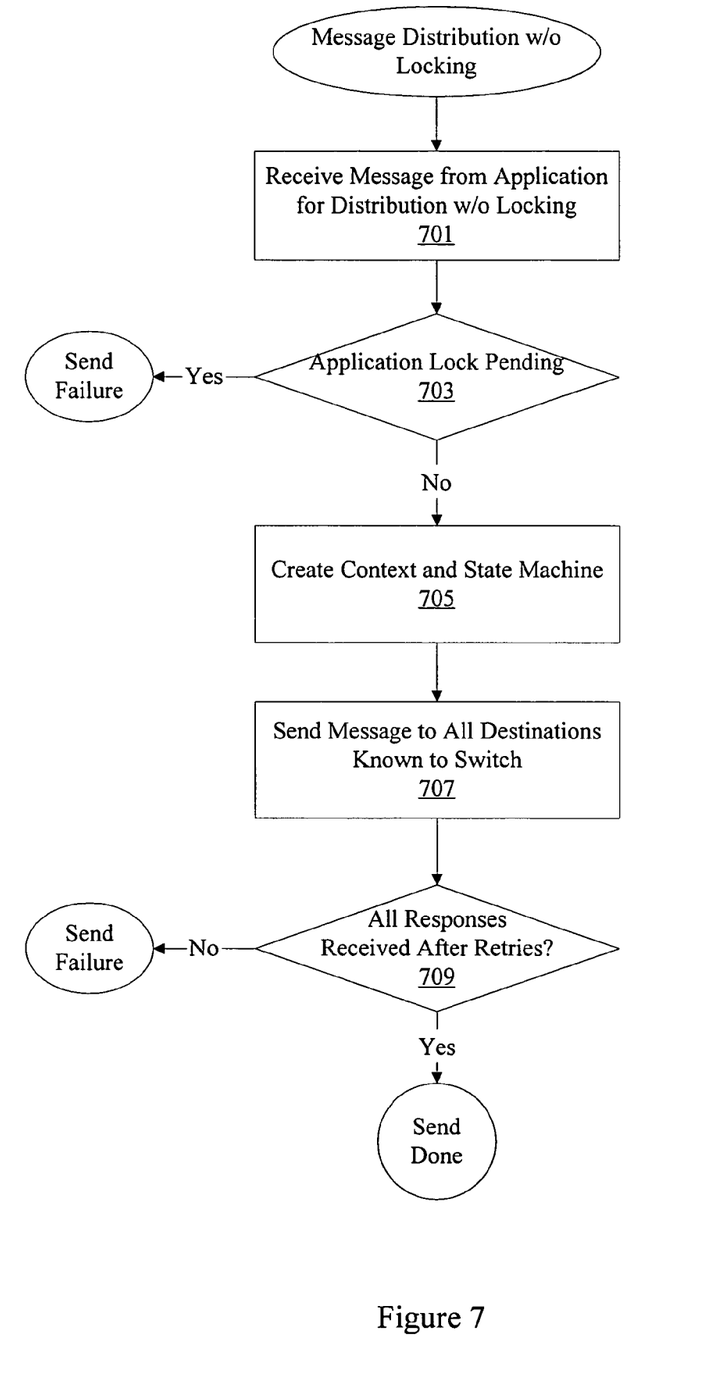
FIG. 7 is a flow process diagram showing a technique for distributing data in a logical fabric without locking.

FIG. 7 is flow process diagram showing a technique for distributing messages without locking. At 701, the message is received from an application for distribution without locking. According to various embodiments, messages can be received from a variety of different applications. In some examples, it is determined which switches support services associated with a particular application. In conventional systems, messages can only be broadcast to all the switches in a particular fabric without regard to whether switches supported a particular application. However, if a switch did not support a particular application, no response would be received or expected.

Consequently, the techniques of the present invention provide mechanisms to allow selective distribution of messages. At 703, it is determined if an application lock is pending. If an application lock is pending, the failure message is sent to the application. If no application lock is pending, the context and the state machine is created at 705. At 707, the message is sent to all destinations known to the switch. According to various embodiments, all destinations known to switch include all switches within a logical or logical fibre channel fabric. Alternatively, all destinations can include all the switches in the physical fabric. According to various embodiments, messages are sent only to destinations known to the switch and not to switches outside of a particular fibre channel fabric.

Particular destination switches may be responsible for sending messages to other fabrics. At 709, it is determined if responses have been received from all of the destinations. According to various embodiments, waiting for all responses may take a relatively long period of time as certain switches may aggregate responses from other fibre channel fabrics before sending a single response back to the source. According to various embodiments, the context information and state machine allow several attempts and retries to be attempted before a determination is made at 709. Is not all responses are received after a certain period of time or after certain number of retirees, a failure message is sent. Otherwise a done message is sent to the application.

Figure 8:
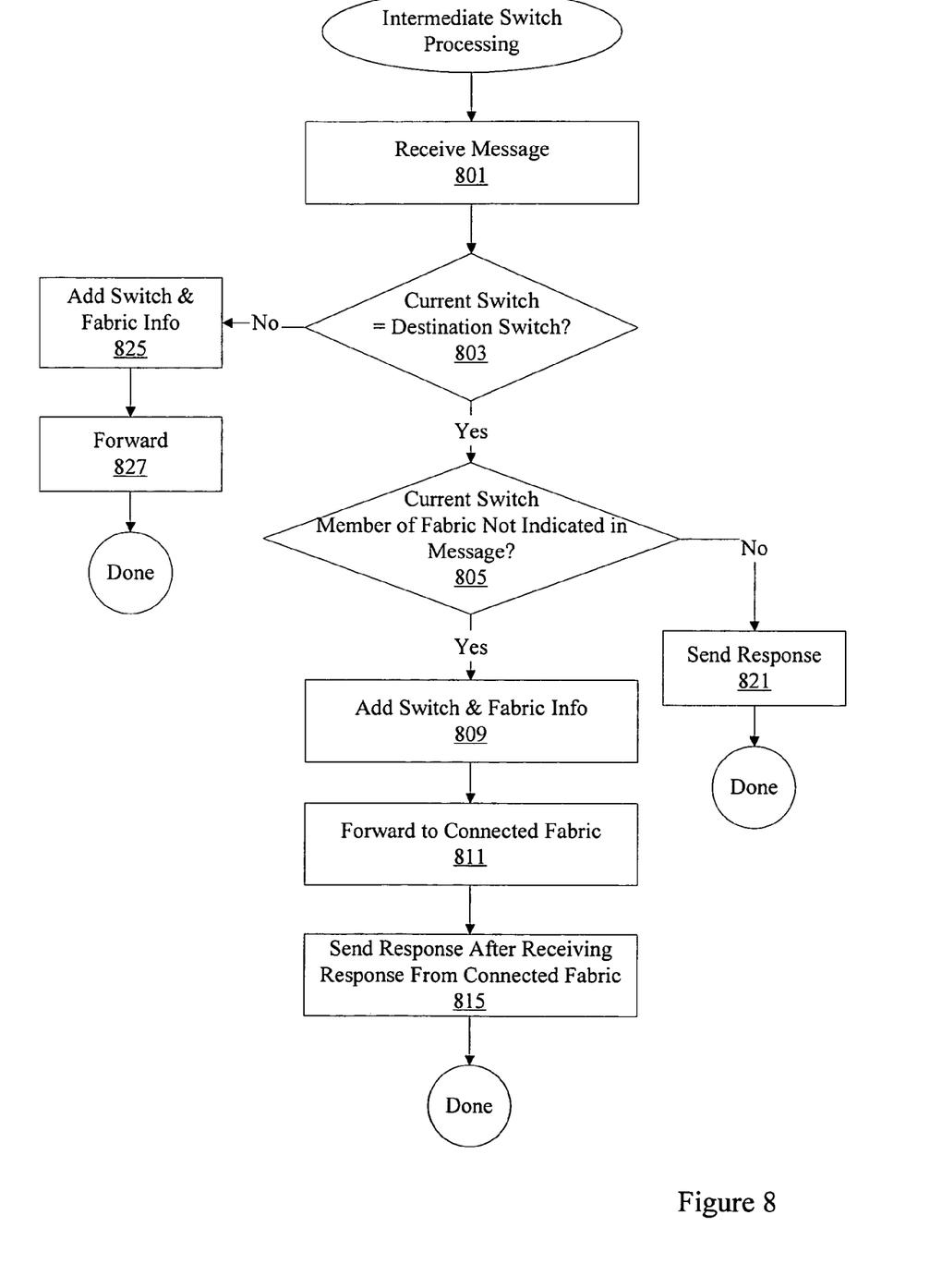
FIG. 8 is a flow process diagram showing a technique for distributing data without locking at a destination switch.

FIG. 8 is a flow process diagram showing a technique for intermediate switch processing. Any device configured to forward a message from one fabric to another fabric in which it is a member is referred to herein as an interconnecting or intermediate switch. According to various embodiments, the intermediate switch receives a message at 801. According to various embodiments, the message received is a message. Any message associated with the switch service distributed to the number of switches associated with multiple fabrics is referred to herein as a message. At 803, destination information is analyzed to determine if the current intermediate switch is the destination switch. If the current switch is not the destination switch, fabric and switch information is added that 825.

According to various embodiments, the switch identifier and a fabric identifier are added in order to prevent duplicated data transmission and distribution of messages. In some examples, unique switch addresses and unique fabric identifiers are added to the payload or header of a message. At 827, the message is forwarded to a next hop towards its destination. If the current switch is the destination switch at 803, it is determined if the current switch is a member of the fabric not indicated in the message.

For example, the current switch may be a member of fabric A and fabric C. It is determined if the message has traversed both fabric A and fabric C at 805. If the current switch is not a member of any fabric not already indicated in the message, a response is sent at 821. If the current switch is a member of a fabric that is not yet mentioned in the message, the fabric information is added at 809. The message is then forwarded to all known members in the connected fabric. According to various embodiments, the message is forwarded to all known members that support services associated with a particular application.

For example, if the current switch is a member of fabric C and fabric C is not already indicated in the message, the message is forwarded to all known destinations in fabric C that support a particular message. According to various embodiments, the switch acts as a distribution switch. Any switch that is used to determine if a message has not already traversed a particular fabric and forward the message to destinations in a particular fabric is also referred to herein as an interconnecting or distribution switch.

Figure 9:
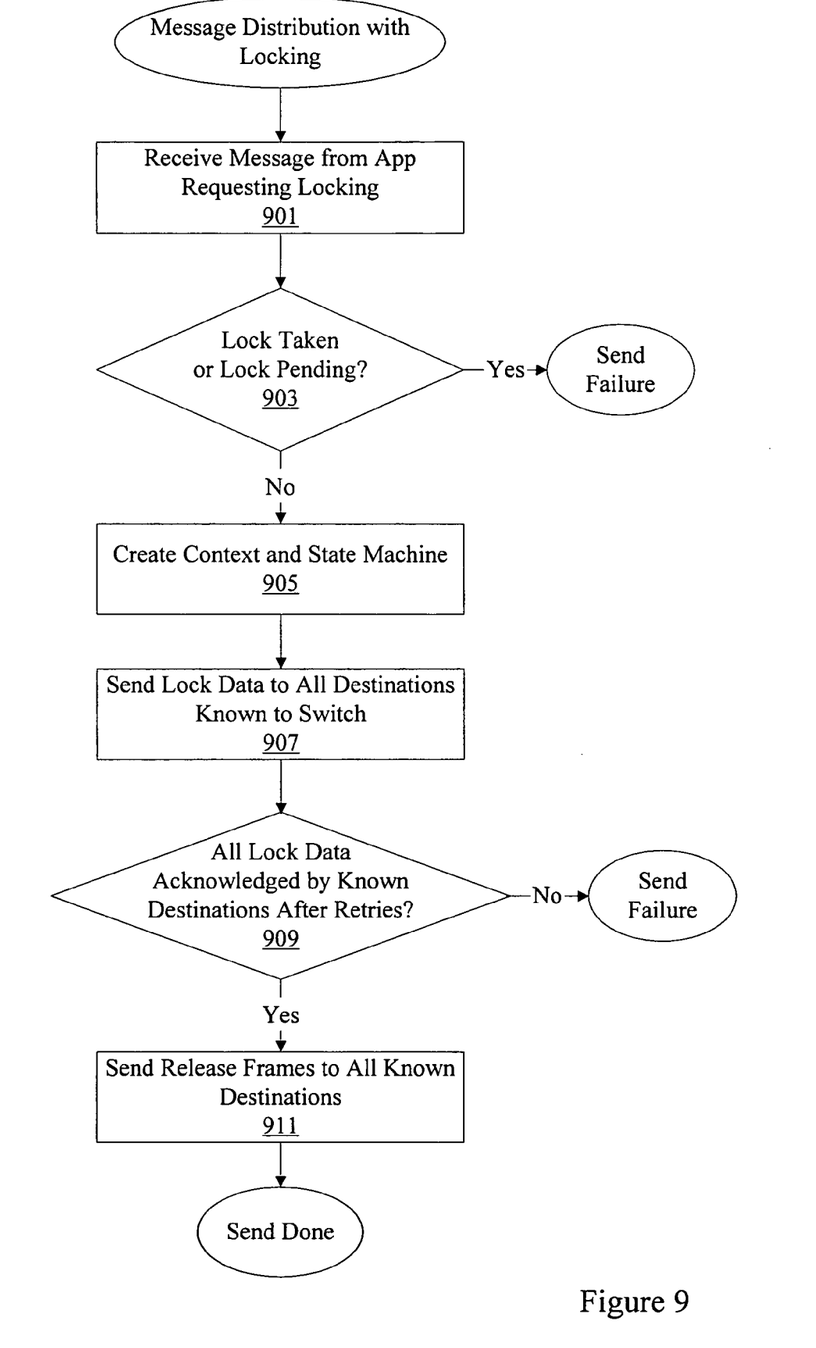
FIG. 9 is a flow process diagram showing a technique for distributing data with locking.

FIG. 9 is a flow process diagram showing the switch distribution with locking. At 901, the message from an application requesting locking is received. At 903, it is determined if the lock is already taken or a lock is pending. If this lock is already taken or a lock is pending, a failure message is sent to the application. If a lock is available, the context and state machine for the message is created at 905. At 907, the combined message having both the lock request and data is sent to all destinations known to the switch. According to various embodiments, a combined message is sent only to destinations supporting the service associated with the application. At 909, it is determined if all combined lock and data messages have been acknowledged by known destinations supporting the particular switch service. In some examples, the state machine and context allow retries. If not all acknowledgment messages are received at 909, failure messages are sent. If the combined messages are acknowledged, release frames are sent to all known destinations at 911 to release the locks.

As described above, techniques for distributing messages may be performed in a variety of network devices or switches. According to various embodiments, a switch includes a processor, network interfaces, and memory. A variety of ports, Media Access Control (MAC) blocks, and buffers can also be provided as will be appreciated by one of skill in the art.

Figure 10:
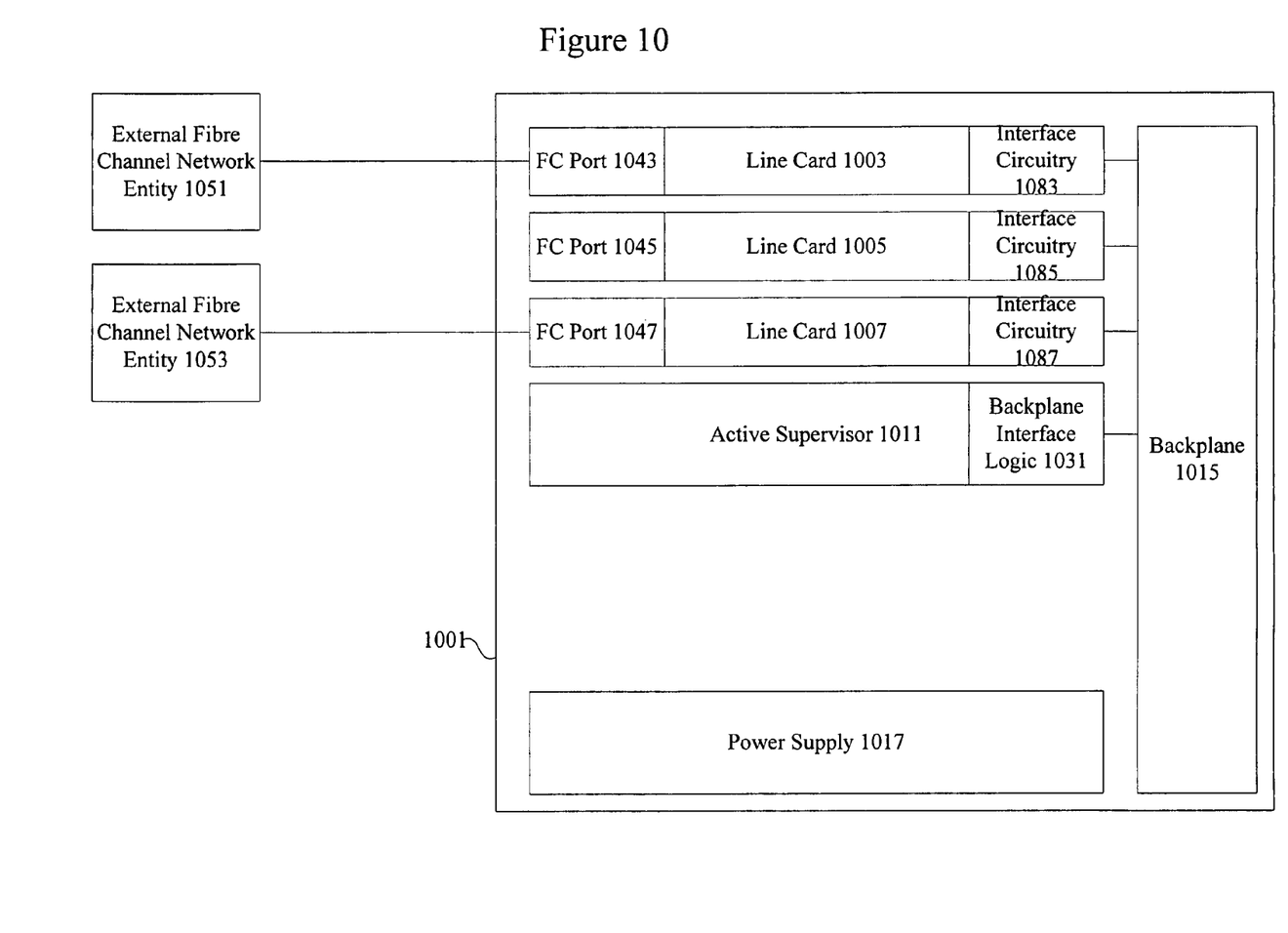
FIG. 10 is a diagrammatic representation of a fibre channel switch.

FIG. 10 is a diagrammatic representation of one example of a fibre channel switch that can be used to implement techniques of the present invention. Although one particular configuration will be described, it should be noted that a wide variety of switch and router configurations are available. The fibre channel switch 1001 may include one or more supervisors 1011. According to various embodiments, the supervisor 1011 has its own processor, memory, and storage resources.

Line cards 1003, 1005, and 1007 can communicate with an active supervisor 1011 through interface circuitry 1083, 1085, and 1087 and the backplane 1015. According to various embodiments, each line card includes a plurality of ports that can act as either input ports or output ports for communication with external fibre channel network entities 1051 and 1053. The backplane 1015 can provide a communications channel for all traffic between line cards and supervisors. Individual line cards 1003 and 1007 can also be coupled to external fibre channel network entities 1051 and 1053 through fibre channel ports 1043 and 1047.

External fibre channel network entities 1051 and 1053 can be nodes such as other fibre channel switches, disks, RAIDS, tape libraries, or servers. It should be noted that the switch can support any number of line cards and supervisors. In the embodiment shown, only a single supervisor is connected to the backplane 1015 and the single supervisor communicates with many different line cards. The active supervisor 1011 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for transmitting messages across logical fibre channel fabrics, the method comprising:
    determining that a plurality of first logical fibre channel fabric switches support a service;
    distributing messages associated with the service to the plurality of first logical fibre channel fabric switches including a first interconnecting switch that is included in both a first logical fibre channel fabric and a second logical fibre channel fabric;
    receiving replies corresponding to the distributed messages from the plurality of first logical fibre channel fabric switches, wherein receiving a reply from the first interconnecting switch indicates that the first interconnecting switch was successful in forwarding the messages to a plurality of second logical fibre channel fabric switches and aggregating responses to the distributed messages from the plurality of second logical fibre channel fabric switches before sending a reply, wherein the first interconnecting switch detects that the distributed messages do not indicate the second logical fibre channel fabric and adds a fabric identifier identifying the second logical fibre channel fabric to the forwarded messages;
    wherein the first interconnecting switch distributes messages to the plurality of second logical fibre channel fabric switches including a second interconnecting switch that is included in both the second logical fibre channel fabric and a third logical fibre channel fabric;
    wherein connecting a third interconnecting switch to the third logical fibre channel fabric does not change routing configuration information at the first interconnecting switch.

2. The method of claim 1, wherein the messages distributed by the first interconnecting switch include information indicating that first logical fibre channel fabric switches have already been sent messages.

3. The method of claim 1, wherein the first interconnecting switch receives replies corresponding to the distributed messages from the plurality of second logical fibre channel fabric switches, wherein receiving a reply from the second interconnecting switch indicates that messages were successfully distributed to a plurality of third logical fibre channel fabric switches.

4. The method of claim 1, wherein information is distributed in a coordinated manner.

5. The method of claim 1, wherein information is distributed in a uncoordinated manner until it is determined that coordinated distribution is pending.

6. The method of claim 1, further comprising locking the first plurality of logical fibre channel switches while information is distributed to the first plurality of logical fibre channel switches.

7. The method of claim 1, wherein distributed information is synchronization information used to synchronize the plurality of logical fibre channel switches in the first and second logical fibre channel networks.

8. The method of claim 1, wherein the first logical fibre channel network is a first logical storage area network.

9. The method of claim 1, wherein the second logical fibre channel network is a second logical storage area network.

10. The method of claim 1, wherein the first logical fibre channel network is a first physical storage area network.

11. The method of claim 10, wherein the second logical fibre channel network is a second physical storage area network.

12. The method of claim 1, wherein the messages are messages setting device aliases.

13. The method of claim 1, wherein the distributed messages comprise application service messages.

14. A logical fibre channel switch, comprising:
    memory;
    a processor coupled to memory, the processor operable to determine that a plurality of first logical fibre channel fabric switches support a service;
    an output interface coupled to the processor, the output interface operable to distribute messages associated with the service to the plurality of first logical fibre channel fabric switches including a first interconnecting switch that is included in both a first logical fibre channel fabric and a second logical fibre channel fabric,
    an input interface coupled to the processor, the input interface operable to receive replies corresponding to the distributed messages from the plurality of first logical fibre channel fabric switches, wherein receiving a reply from the first interconnecting switch indicates that the first interconnecting switch was successful in forwarding the messages to a plurality of second logical fibre channel fabric switches and aggregating responses to the distributed messages from the plurality of second logical fibre channel fabric switches before sending a reply, wherein the first interconnecting switch detects that the distributed messages do not indicate the second logical fibre channel fabric and adds a fabric identifier identifying the second logical fibre channel fabric to the forwarded messages;
    wherein the first interconnecting switch distributes messages to the plurality of second logical fibre channel fabric switches including a second interconnecting switch that is included in both the second logical fibre channel fabric and a third logical fibre channel fabric;
    wherein connecting a third interconnecting switch to the third logical fibre channel fabric does not change routing configuration information at the first interconnecting switch.

15. The logical fibre channel switch of claim 14, wherein the first interconnecting switch distributes messages to the plurality of second logical fibre channel fabric switches.

16. The logical fibre channel switch of claim 14, wherein the service is a particular version of an application.

17. The logical fibre channel switch of claim 16, wherein the application is not aware of the switches it is communicating with.

18. The logical fibre channel switch of claim 14, wherein the first and second logical fibre channel fabric switches reside in a third logical fabric.

19. The logical fibre channel switch of claim 15, wherein the messages distributed by the first interconnecting switch include information indicating that first logical fibre channel fabric switches have already been sent messages.

20. The logical fibre channel switch method of claim 14, wherein the distributed messages comprise application service messages.

21. A method for distributing information from a logical fibre channel switch, the method comprising:

determining that a plurality of first logical fibre channel fabric switches support a service;

distributing application service messages associated with the service to the plurality of first logical fibre channel fabric switches including a first interconnecting switch that is included in both a first logical fibre channel fabric and a second logical fibre channel fabric;

receiving replies corresponding to the distributed messages from the plurality of first logical fibre channel fabric switches, wherein receiving a reply from the first interconnecting switch indicates that the first interconnecting switch was successful in forwarding the application service messages to a plurality of second logical fibre channel fabric switches and aggregating responses to the distributed messages from the plurality of second logical fibre channel fabric switches before sending a reply, wherein the first interconnecting switch detects that the distributed messages do not indicate the second logical fibre channel fabric and adds a fabric identifier identifying the second logical fibre channel fabric to the forwarded messages;

wherein the first interconnecting switch distributes application service messages to the plurality of second logical fibre channel fabric switches including a second interconnecting switch that is included in both the second logical fibre channel fabric and a third logical fibre channel fabric;

wherein connecting a third interconnecting switch to the third logical fibre channel fabric does not change routing configuration information at the first interconnecting switch.

22. The method of claim 21, wherein the messages distributed by the first interconnecting switch include information indicating that first logical fibre channel fabric switches have already been sent messages.

23. The method of claim 21, wherein the first interconnecting switch receives replies corresponding to the distributed messages from the plurality of second logical fibre channel fabric switches, wherein receiving a reply from the second interconnecting switch indicates that messages were successfully distributed to a plurality of third logical fibre channel fabric switches.

24. The method of claim 21, wherein information is distributed in a coordinated manner.

25. The method of claim 21, wherein information is distributed in a uncoordinated manner.

26. The method of claim 21, further comprising locking the first plurality of logical fibre channel switches while information is distributed to the first plurality of logical fibre channel switches.

* * * * *